US012639047B2

(12) United States Patent
Appel et al.

(10) Patent No.: US 12,639,047 B2
(45) Date of Patent: May 26, 2026

(54) MODEL DOCUMENT CREATION IN SOURCE CODE DEVELOPMENT ENVIRONMENTS USING SEMANTIC-AWARE DETECTABLE ACTION IMPACTS

(71) Applicant: INTERNATIONAL BUSINESS MACHINES CORPORATION, Armonk, NY (US)

(72) Inventors: Ana Paula Appel, Sao Paulo (BR); Renato Luiz de Freitas Cunha, Sao Paulo (BR); Carlos Raoni de Alencar Mendes, Rio de Janeiro (BR); Emilio Ashton Vital Brazil, Rio de Janeiro (BR); Marcelo Nery dos Santos, Rio de Janeiro (BR); Marco Aurelio Stelmar Netto, Sao Paulo (BR); Priscilla Barreira Avegliano, Sao Paulo (BR); Renan Francisco Santos Souza, Rio de Janeiro (BR); Vinicius Costa Villas Boas Segura, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 17/353,731

(22) Filed: Jun. 21, 2021

(65) Prior Publication Data

US 2022/0405065 A1 Dec. 22, 2022

(51) Int. Cl.
| | |
|---|---|
| *G06F 8/34* | (2018.01) |
| *G06F 8/35* | (2018.01) |
| *G06N 5/02* | (2023.01) |

(52) U.S. Cl.
CPC .................. *G06F 8/34* (2013.01); *G06F 8/35* (2013.01); *G06N 5/02* (2013.01)

(58) Field of Classification Search
CPC .... G06F 8/34; G06F 8/35; G06F 8/73; G06N 5/02; G06N 20/00; G06N 5/022
See application file for complete search history.

(56) References Cited

U.S. PATENT DOCUMENTS

| | | | |
|---|---|---|---|
| 8,145,677 | B2 | 3/2012 | Al-Shameri |
| 9,342,908 | B2 * | 5/2016 | Hirsch .................. G06T 11/206 |

(Continued)

FOREIGN PATENT DOCUMENTS

| | | |
|---|---|---|
| EP | 3 376 361 B1 | 2/2021 |
| WO | 2017058932 A1 | 4/2017 |

OTHER PUBLICATIONS

"Knowledge Graph Visualization in Data Graphs", Paul Wilton, May 9, 2021 (Year: 2021).*

(Continued)

*Primary Examiner* — Noor Alkhateeb
(74) *Attorney, Agent, or Firm* — CHIP LAW GROUP

(57) ABSTRACT

A method and system of generating a documentation includes monitoring user actions regarding a model development, wherein the user actions are captured in a source code development environment. Semantic meaning is provided for each user action captured in the source code development environment. A degree of impact of each user action is determined in connection with the model. Actions having a degree of impact in the development of the model that is above a predetermined threshold are identified as impactful actions. An interactive knowledge graph is identified based on the user actions, semantic meaning of each (Continued)

action, and the determined degree of impact of each user action. The interactive knowledge graph is provided to be displayed in a navigable way.

15 Claims, 8 Drawing Sheets

(56) References Cited

U.S. PATENT DOCUMENTS

| | | | |
|---|---|---|---|
| 9,983,859 B2 | 5/2018 | Mascaro et al. | |
| 10,176,032 B2 | 1/2019 | Horrell et al. | |
| 10,318,503 B1 | 6/2019 | Swamy | |
| 10,360,507 B2 | 7/2019 | Aravamuda et al. | |
| 10,394,532 B2 | 8/2019 | Bar-Or et al. | |
| 10,691,710 B2 | 6/2020 | Reynolds et al. | |
| 10,725,747 B1 * | 7/2020 | Nene | G06F 8/35 |
| 10,796,230 B2 * | 10/2020 | Ferrara | G09B 5/06 |
| 10,867,249 B1 * | 12/2020 | Bosnjakovic | G06N 5/02 |
| 10,877,654 B1 * | 12/2020 | Speare | G06F 9/451 |
| 11,243,652 B2 * | 2/2022 | Smith | G06F 16/24575 |
| 11,816,618 B1 * | 11/2023 | Cheek, Jr. | G06T 3/40 |
| 12,008,390 B1 * | 6/2024 | Faulhaber | G06F 9/54 |
| 2014/0215495 A1 * | 7/2014 | Erich | G06F 11/3438 |
| | | | 719/318 |
| 2016/0216923 A1 | 7/2016 | Willamowski et al. | |
| 2016/0232457 A1 | 8/2016 | Gray et al. | |
| 2016/0364405 A1 * | 12/2016 | Konik | G06F 16/2358 |
| 2017/0017903 A1 | 1/2017 | Gray et al. | |
| 2017/0178027 A1 * | 6/2017 | Duggan | G06F 9/543 |
| 2017/0329747 A1 * | 11/2017 | Noursalehi | G06N 7/01 |
| 2018/0129941 A1 * | 5/2018 | Gustafson | G06N 20/00 |
| 2018/0165604 A1 | 6/2018 | Minkin | |
| 2018/0329958 A1 * | 11/2018 | Choudhury | G06F 16/2456 |
| 2020/0099773 A1 * | 3/2020 | Myers | H04L 67/34 |
| 2020/0234200 A1 | 7/2020 | Madison et al. | |
| 2021/0073915 A1 * | 3/2021 | Crabtree | G06Q 30/0611 |
| 2021/0089860 A1 * | 3/2021 | Heere | G06N 20/00 |
| 2021/0286834 A1 * | 9/2021 | Morse | G06F 16/367 |
| 2021/0366617 A1 * | 11/2021 | Henry | H04W 4/025 |
| 2021/0386313 A1 * | 12/2021 | Krishnamoorthy | G06N 20/00 |
| 2023/0004792 A1 | 1/2023 | De Mello Brandao et al. | |

OTHER PUBLICATIONS

NPL (April et al., "How Data Scientists Use Computational Notebooks for Real-Time Collaboration", Nov. 2019) (Year: 2019).*

NPL (Pimentel, "Collecting and Analyzing Provenance on Interactive Notebooks: when IPython meets noWorkflow", Jul. 2015) (Year: 2015).*

("Geographical Python Teaching Resources: geopyter", Jonathan Reades et al., Apr. 23, 2021) (Year: 2021).*

("Network visualizations with Pyvis and VisJS", Giancarlo Perrone et al., 2020) (Year: 2020).*

Mell, P. et al., "Recommendations of the National Institute of Standards and Technology"; NIST Special Publication 800-145 (2011); 7 pgs.

Figueredo De Santana, V. et al., "Summarizing Observational Client-side Data to Reveal Web Usage Patterns"; SAC (2010); Sierre, Switzerland, 5 pgs.

Kery, M. et al., "The Story in the Notebook: Exploratory Data Science using a Literate Programming Tool"; Association for Computing Machinery (2018); Montreal, QC, Canada, 11 pgs.

Kery, M. et al., "Towards Effective Foraging by Data Scientists to Find Past Analysis Choices"; Association for Computing Machinery (2019); Glasgow, Scotland UK; 13 pgs.

Kery, M. "An experimental tool that stores and visualizes local versioning in JupyterLab"; https://github.com/mkeryVerdant, downloaded Jun. 14, 2021, 5 pgs.

Carvalho, L. et al., "NiW: Converting Notebooks into Workflows to Capture Dataflow and Provenance"; Workshop on Capturing Scientific Knowledge (SciKnow) (2017); Austin, TX, 7 pgs.

Grafberger, S. et al., "MLINSPECT: A Data Distribution Debugger for Machine Learning Pipelines"; Association for Computing Machinery (2021); 4 pgs.

Samuel, S. et al., "ProvBook: Provenance-based Semantic Enrichment of Interactive Notebooks for Reproducibility"; Friedrich Schiller University (2018), Jena, Germany, 4 pgs.

Burzacca, P. et al, "Analysis and Visualization of Interactions with Mobile Web Applications"; IFIP International Federation for Information Processing (2013); Interact (2013) Part IV, LNCS 8120, pp. 515-522.

* cited by examiner

INTERACTION AND EXECUTION DATA RETRIEVAL HANDLER 172

IMPACT AND/OR SEMANTIC AWARE GRAPH GENERATOR 174

ACTION IMPACT DETECTOR 176

REPORT GENERATOR 178

DOCUMENT CREATION ENGINE 103

CLOUD 120

INTERACTIVE COMPUTING NOTEBOOK 112

113

NETWORK

DOCUMENTATION SERVER 116

USER INTERACTION

102(1)
101(1)
102(2)
101(2)
102(N)
101(N)

105(1) 106
105(2)
105(N)

100

308 — TEMPLATES FOR CONSUMING NAVIGABLE GRAPHS AND INFO DETAILS

306 — STAKEHOLDERS

DATA ENGINEERING

302

310 data selection data transformation

312

320 model training impactful action file Weather Pattern was selected
ZOOM IN: files WeatherV1, WeatherV5, WeatherV7 were attempted, and those were the results: x,y,z impactful action considered only last 3 years
ZOOM IN: also considered 1 to 10 years, and results were x,y,z impactful action alpha 0.4 which represents weight of risk in a loan generated
ZOOM IN: also considered alpha from 0.1 to 2.0, and these are the results....

Note: variables can be tied to industry domain variables via knowledge base. Example, an alpha variable can be associated with a loan risk, or stock volatility, or accident probability 6. With the stored information, the system can generate a navigable graph, grouping actions in meaningful steps and allowing users to explore the whole interconnected model lifecycle.

500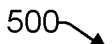
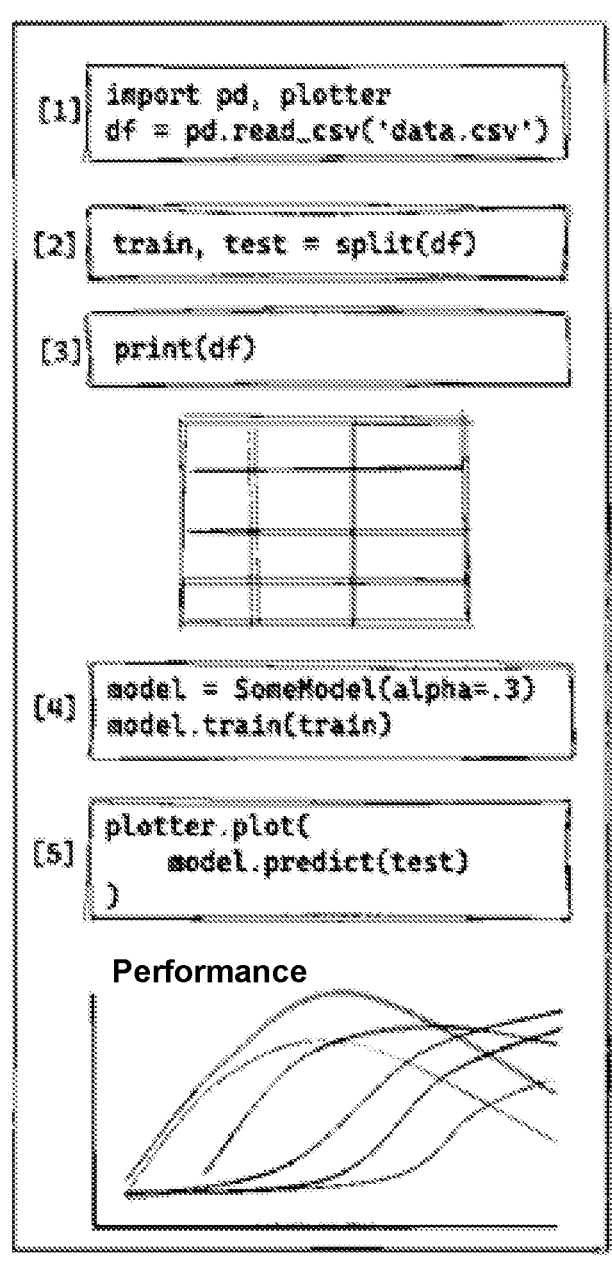
FIG. 5

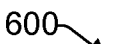
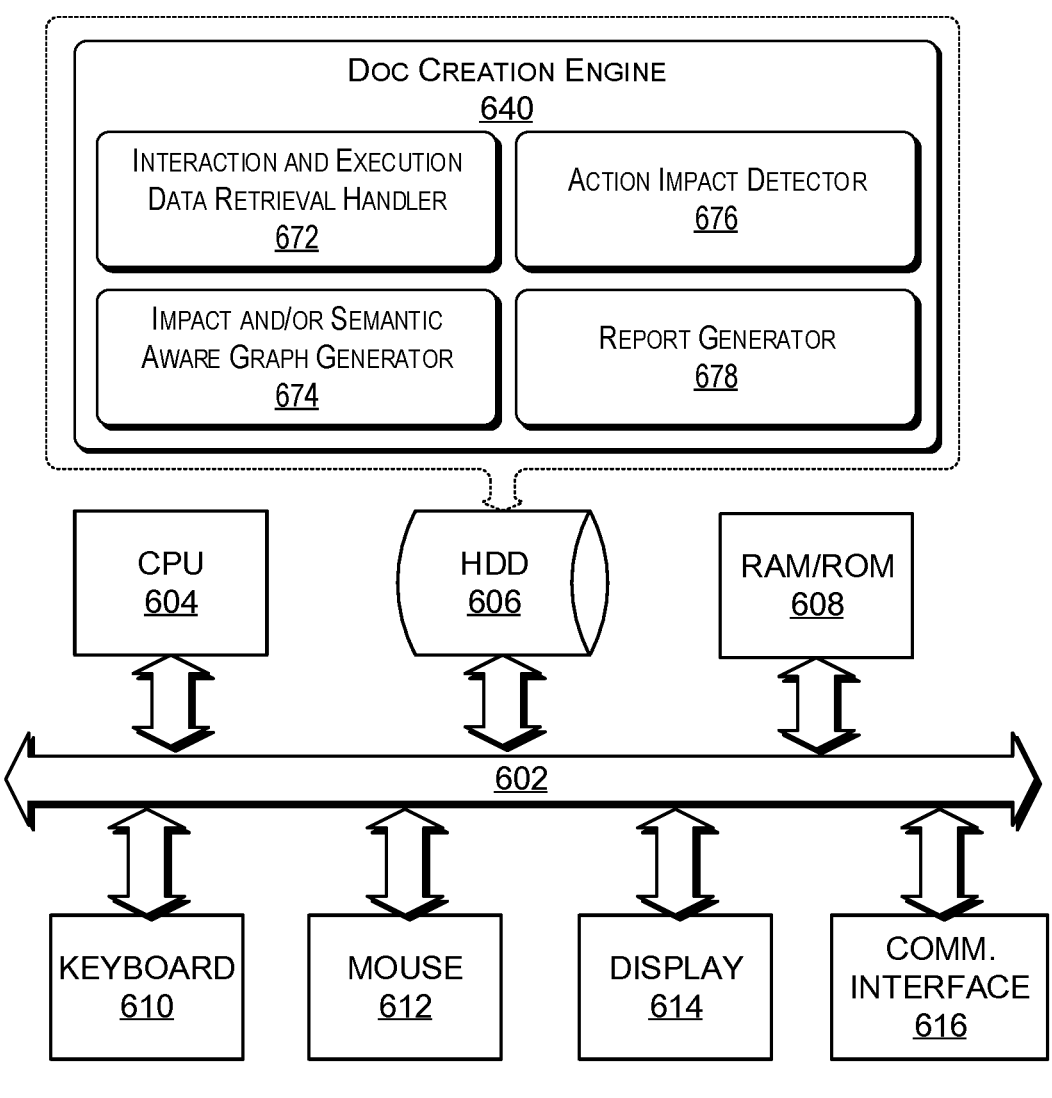
FIG. 6

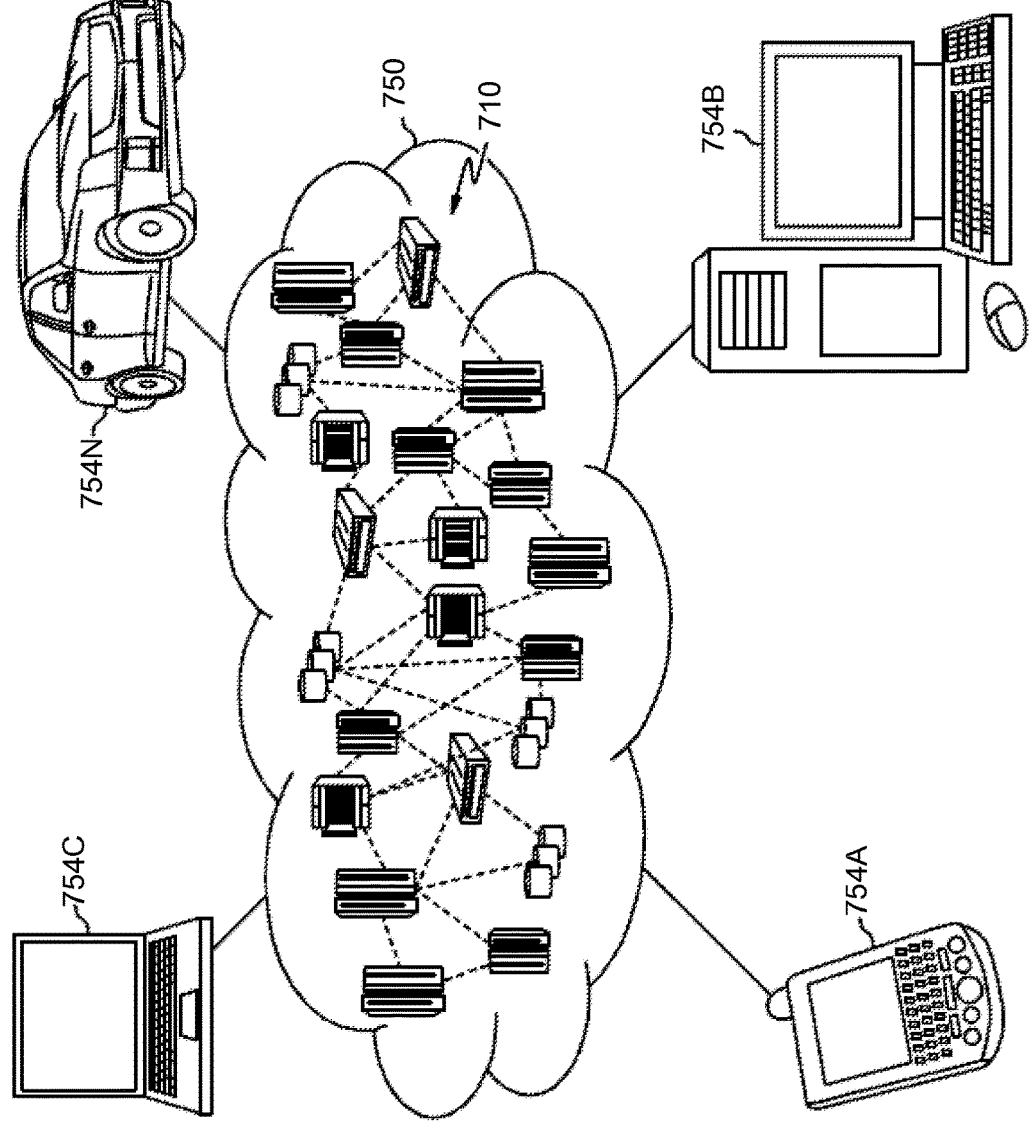
754N
754C
754B
754A
750
710
700
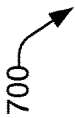
FIG. 7

MODEL DOCUMENT CREATION IN SOURCE CODE DEVELOPMENT ENVIRONMENTS USING SEMANTIC-AWARE DETECTABLE ACTION IMPACTS

BACKGROUND

Technical Field

The present disclosure generally relates to data science, and more particularly, to computer systems that are configured to providing documentation of a source code development environments to facilitate understanding of a development of a model.

Description of the Related Art

In recent years, data science has become a salient consideration in various industries, being responsible for transforming data into knowledge and insights supporting decision-making processes. Specific knowledge from data science basics, such as mathematics, artificial intelligence, databases, cloud computing, and data visualization often needs to be applied to a particular industry domain (e.g., oil & gas, weather pattern, retail). To that end, data scientist may perform experiments and properly document them. For some industries, the processes' documentation could affect the success of a data science project. For instance, any model used in characterizing a power plant, may be auditable by a third party. Therefore, the model lifecycle documentation is relevant and may involve different detail levels depending on who will assess the model. As used herein, assessing a model relates to understanding how the model was created, including its parameters, datasets, and algorithms. Since the data scientists' daily work typically involves validating many hypotheses by executing experiments and evaluating the results through the lens of specific domain concepts, the documentation task at meaningful resolution may overburden and therefore is often not practically possible. Moreover, if one considers registering key actions during the modeling process, this overload further expounds the unfeasibility of documentation by a data scientist. Indeed, the volume of time involved to document the steps executed during the creation and/or tuning of a model that avoids inadvertent omission of salient steps in the document is increasingly becoming a bottleneck in the efficient transformation of research data into a viable model that is adequately documented.

SUMMARY

According to various embodiments, a computing device, a non-transitory computer readable storage medium, and a method are provided for documenting a development of a model. User actions regarding a model development are monitored, wherein the user actions are captured in a source code development environment. Semantic meaning is provided for each user action captured in the source code development environment. A degree of impact of each user action in connection with the model is determined. Actions having a degree of impact in the development of the model that is above a predetermined threshold are identified as impactful actions. An interactive knowledge graph is developed based on the user actions, semantic meaning of each action, and the determined degree of impact of each user action. The interactive knowledge graph is provided to be displayed in a navigable way.

In one embodiment, the source code development environment is an interactive computing notebook.

In one embodiment, monitoring the user actions includes determining contents of each code fragment of the interactive computing notebook; determining a length of time the user interacted with a corresponding code fragment in the source code development environment; identifying changes made in a code of the model, comprising changes in variable values, functions, and/or modules; and/or determining an order of execution of the source code.

In one embodiment, the length of time the user interacted with the corresponding code fragment is indicative of an importance of a user action performed in the code fragment.

In one embodiment, the determination of the degree of impact of each user action in connection with the model, is based on a change in the source code comprising at least one of: a change in a variable value, a change in a function, or a change in a module of the source code.

In one embodiment, the determination of the degree of impact of each user action in connection with the model is based on a number of times a different value is used for a model parameter.

In one embodiment, the determination of the degree of impact of each user action in connection with the model is based on a determination that the user transforms a dataset of the source code development environment.

In one embodiment, the determination of the degree of impact of each user action in connection with the model is based on a determination that the user transitioned from a data preprocessing phase to a building phase of the model.

In one embodiment, the predetermined threshold for each corresponding action is automatically learned by the document creation engine using machine learning algorithms and past detected impact actions from other user interactions from another source code development environment.

In one embodiment, the predetermined threshold for each corresponding action is received from a knowledge database.

In one embodiment, the interactive knowledge graph includes nodes and edges comprising a code fragment execution, one or more variables identified in the source code development environment, one or more data transformations in the source code development environment, the models used, and/or the degree of impact the user actions identified for each code fragment.

In one embodiment, one or more nodes of the interactive knowledge graph can be expanded to provide more detailed information about the model development.

In one embodiment, providing the interactive knowledge graph in a navigable way includes determining a recipient of the knowledge graph; determining whether there is a template for the recipient of the knowledge graph; and displaying the navigable knowledge graph in a level of detail based on the template.

By virtue of the teachings herein, a documentation of a model development in a source code development environment provides a more efficient and accurate identification of salient actions performed in the development and the debugging of the subject model. Customized views of the actions, levels of details, that is sensitive to the semantic of the actions and content based on model development action impact levels, as well as purpose-or-stakeholder-based templates are provided. The evaluation of each action performed by a user is semantic-aware and can identify the impact of each action.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 3 is a conceptual data engineering flow of documenting a model development, consistent with an illustrative embodiment.

FIG. 5 illustrates an example interactive computing notebook.

FIG. 6 provides a functional block diagram illustration of a computer hardware platform that can be used to implement a particularly configured computing device that can host a document creation engine.

FIG. 7 depicts a cloud computing environment, consistent with an illustrative embodiment.

DETAILED DESCRIPTION

Overview

Figure 1:
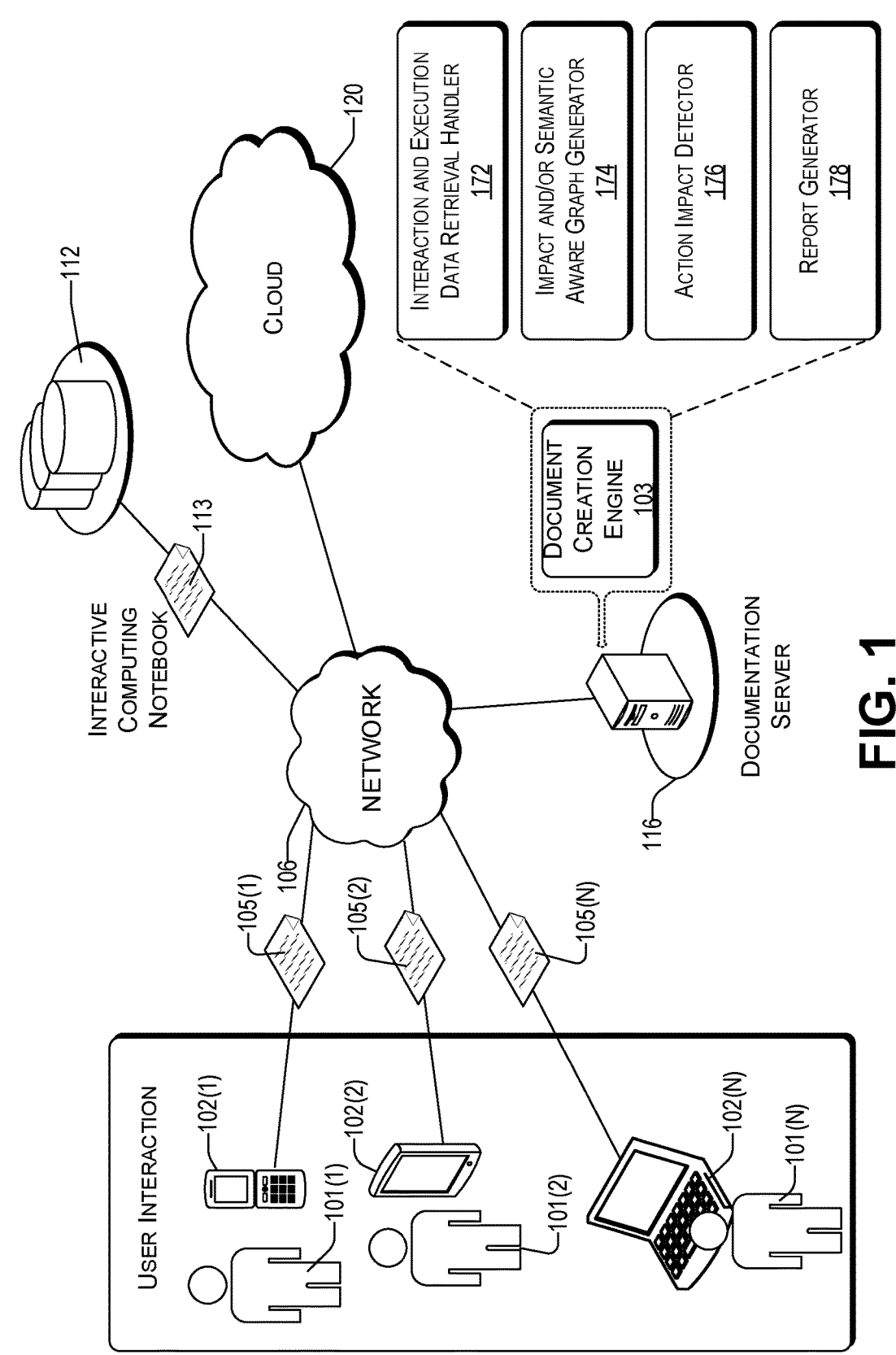
FIG. 1 is an example architecture of a system for the creation of a model document in source code development environment using semantic-aware detectable action impacts, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and computerized methods of automatically creating model documents in an interactive computing notebook using semantic-aware detectable action impacts. Today, literate programming or literate computing tools are used by countless programmers. Such tools facilitate presenting data analyses in the form of a narrative. In this regard, source code development environments, such as interactive computing notebooks, can provide a summary of the actions that a user has taken in the development of a model. A computing notebook is an interactive computing environment that is configured to provide a notebook document. A notebook document may be a Java Script Object Notation (JSON) document that includes an ordered list of input/output cells that may include, without limitation, text, source code, plots, figures, expressions of mathematical relationships, rich media, etc. An interactive computing notebook comprises a sequence of cells, sometimes referred to herein as a code fragment or notebook fragment. As used herein, cell is a multiline text input field. The execution behavior of a cell is determined by the cell's type. There are generally three types of cells: code cells, markdown cells, and raw cells.

The interactive computing notebooks discussed herein can be used, for example, to accelerate machine learning modeling. However, presently there is a lack of an architecture that supports the documentation of modeling without substantially relying on the characterization by the data scientist, which is typically not effective given the complexities and detail involved in harvesting and emphasizing the relevant data and/or considerations in developing the model. The typical workflow using interactive computing notebooks merely enables the data scientist to write comments based on markup languages, which is often not sufficiently detailed or accurate and may unnecessarily overload modeling efforts, thereby making it impractical to be performed by a data scientist. Further, known approaches are static, since they do not support generating multiple (e.g., different types of) documentation tailored to different audiences and purposes. The challenge with existing approaches is exacerbated when the data sets are massive as in the case of big data analysis. Existing solutions fail to be intuitive to the user with a learning curve that is arduous and time consuming. Such a deficiency may lead to a decrease in user (i.e., data scientist) productivity as the user may waste effort attempting to interpret the complexity inherent in data science without meaningful success.

In one aspect, the teachings herein provide design guidance for future literate programming and literate computing tools, such as providing a history search capability based on how programmers recall their explorations, through contextual details including images and parameters. A navigable graph is automatically provided the computing device, which considers both the semantics of the content, as well as the impact of the user's actions in developing the subject model.

The proposed system automatically generates navigable documentation of exploratory and development actions highlighting impactful actions during the development and/or tuning of data driven models in interactive computing notebooks. A navigable graph is provided that explains the provenance of actions during the development phase, which is captured without requiring additional work from data scientists. The navigable graph also can provide the ontology of the data-driven programming characteristics (e.g., phases of a traditional development around model creation including data retrieval, data preparation, model training, model testing, data visualization, and programming features for each phase—a model training usually has a software call function that has an algorithm specification and its input parameters). Each action (e.g., interaction with the interactive computing notebook) performed by a data scientist can be detected in a semantic-aware way. Impacts of the actions taken by the data scientist that are captured in the interactive computing notebook can be translated into weights in the nodes and vertices of the generated interactive navigable graph. Model variables and/or properties can be associated with industry domain knowledge. In this way, a highly accurate documentation of an interactive computing notebook is provided in a time efficient way. The techniques described herein may be implemented in a number of ways. Example implementations are provided below with reference to the following figures.

Example Architecture

FIG. 1 illustrates an example architecture 100 of a system for the creation of a model document in a source code development environment, sometimes referred to herein as an interactive computing notebook, using semantic-aware detectable action impacts, consistent with an illustrative embodiment. Architecture 100 may include one or more users 101(1) to 101(N) who can interact individually or collaboratively with interactive computing notebooks 113 stored in a data repository 112. The interactive computing notebook 113, is a representation of all content visible in an application being developed by the one or more users 101(1) to 101(N), including inputs and outputs of the computations, explanatory text, mathematics, images, and rich media representations of objects. Each user 101(1) to 101(N) can interact with the interactive computing notebook 113 by way of sending and receiving electronic data packages 105(1) to 105(N) over a network 106. The electronic data packages 101(1) to 105(N) may include various user interactions with the cells of the interactive computing notebook 113, such as, without limitation, cell contents, length of time a user interacts with a cell, changes in the code (e.g., including changes in variable values, functions, modules, etc.), data loads and transformations, definition of models, which cell(s) a user interacts with most, order of execution, etc.

There is a network that 106 allows the various user devices 102(1) to 101(N) to communicate with a data repository 112, a documentation server 116, and/or each other. The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with various databases, the Internet, and the cloud 120.

For discussion purposes, different user/computing devices (e.g., 102(1) to 102(N)) appear in the drawing, to represent some examples of the client devices that may be used by a user (e.g., 101(1) to 102(N)) to communicate over the network 106. Today, user devices typically take the form of portable handsets, smart-phones, tablet computers, personal digital assistants (PDAs), and smart watches, although they may be implemented in other form factors, including consumer, medical, and business electronic devices.

The data repository 112 is configured to store one or more computing notebooks that may be created by the document creation engine 103 of the documentation server 116. The documentation server 116 may comprise a group of computing resources that hosts a document creation engine 103 and executes the user program (i.e., the model being developed inside the interactive computing notebook). The document creation engine 103 may have four main modules for generating navigable graphs of development actions for model document creation and/or tuning in interactive computing notebook 113. There may be an interaction and execution detail retrieval handler module 172 that is operative to capture all data packages (e.g., 105(1) to 105(N)) related to user interaction and execution of cells of an interactive computing notebook 113. This module 172 may also host the ontologies to understand the semantics of the content that was retrieved. In one embodiment, concept expansion, such as the IBM Watson Concept Expansion™ can be used to identify the concept cues in a cell of the interactive computing notebook 113 to determine the intent thereof. In this regard, large sets of unstructured sets of data may be provided to the interaction and execution data retrieval handler 172 module of the document creation engine 103 during a training stage, such that it can learn therefrom. The large sets of unstructured data may relate to prior cells of interactive computing notebooks that were successfully interpreted by the document creation engine 103, which now acts as a corpus of data to learn from. Such concept expansion enables the creation of a specialized dictionary for the cognitive application of identifying the subject matter and scope of the subject cell of an interactive computing notebook 113, collectively referred to herein as the "intent" of the cell. Concept expansion enables the document creation engine 103 to build a specialized dictionary for the cognitive application of interacting with the content generated by a user (e.g., 101(1)). Accordingly, by virtue of the interaction and execution data retrieval handler 172, the document creation engine 103 can correctly understand industry specific terminology, local euphemisms, and colloquial terms that may be specific to a domain.

The document creation engine 103 may include an impact and/or semantic aware graph generator 174 that is operative for the generation of an interactive graph based on the action impacts and semantics of the content of the interactive computing notebook cells captured by the document creation engine 103.

The document creation engine 103 may include an action impact detector 176 that may detect the impact of an action or a set of actions performed by a user (e.g., data scientist) while interacting with the interactive computing notebook 113.

The document creation engine 103 may further include a report generator 178 that generates a navigable graph that is accessible to the user. The navigable graph can be in multiple formats, such as webpages with links or documents (e.g., PDFs, Word, etc., with links for user consumption).

At predetermined intervals or upon a trigger event, the document creation engine 103 captures the actions taken by the data scientist from the interactive computing notebook 113 stored in the data repository 112, and adds a semantic layer to the actions, providing meaning to each action, including industry domain information. These concepts are explained in more detail below in the context of the discussion of FIGS. 2 and 3.

While the data repository 112 and the documentation server 116 and computing devices 102(1) to 102(N) are illustrated by way of example to be on different platforms, it will be understood that, in different embodiments, these platforms may be combined in different combinations. In other embodiments, one or more of these computing platforms may be implemented by virtual computing devices in the form of virtual machines or software containers that are hosted in the cloud 120, thereby providing an elastic architecture for processing and storage. The cloud is discussed in more detail later.

Example Conceptual Overview of System

Figure 2:
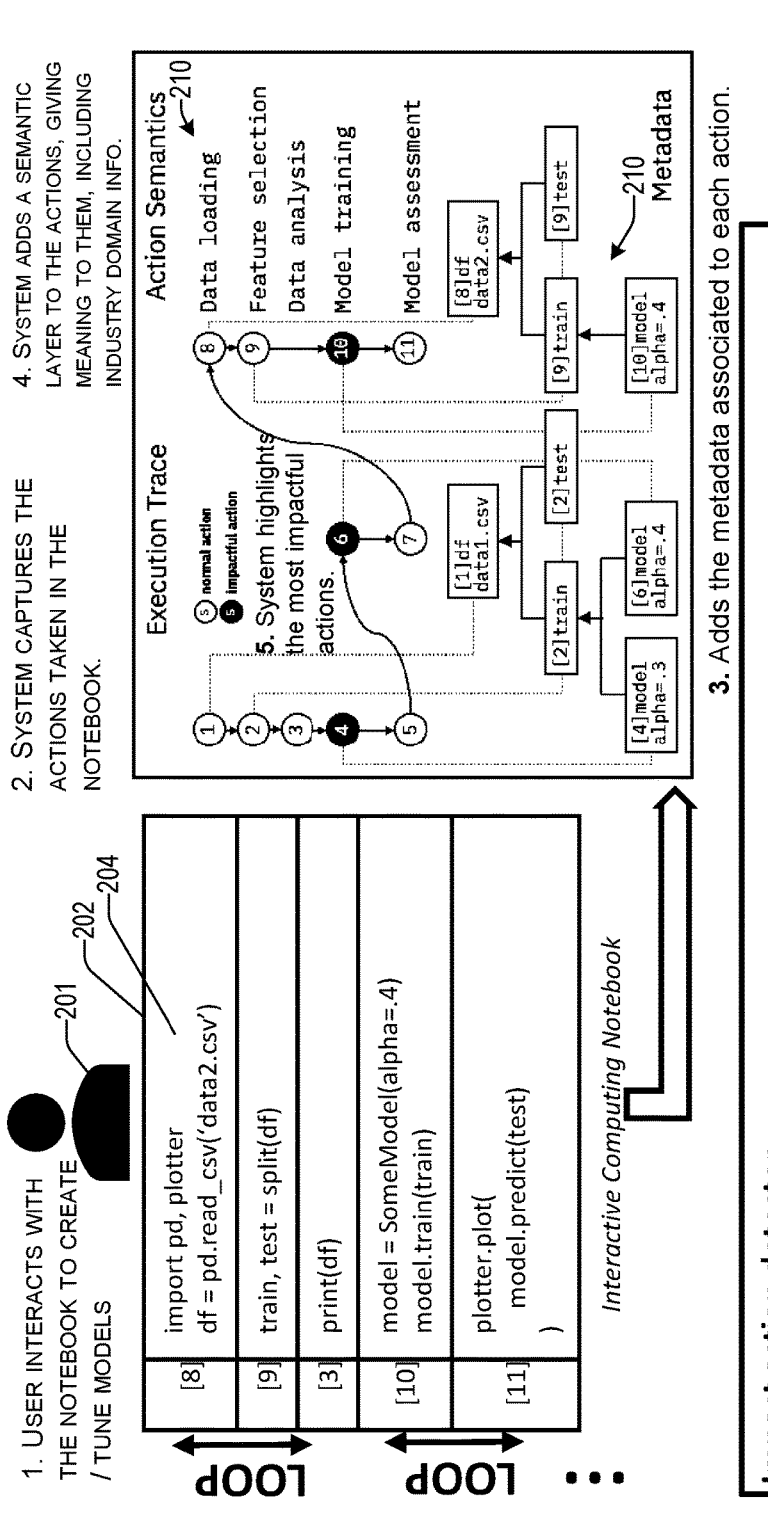
FIG. 2 is a conceptual overview of a creation of a model document, consistent with an illustrative embodiment.

Reference now is made to FIG. 2, which illustrates a conceptual overview of a creation of a model document, consistent with an illustrative embodiment. As mentioned above, a data scientist may be involved in a process of developing a machine learning model. The development of the model may be in the context of a computing notebook, which is configured to store cells in the development of the model. Often it is not understood of how a model was created and whether the appropriate considerations were made. This understanding may be solicited from an audience comprising fellow data scientists or other stakeholders of the model, such as CEO, manager, etc. Accordingly, the audience may want to have an understanding of the development of the model from different perspectives and levels of granularity, based on the member of the audience, including type of data used, level of filtration, amount of time spent on different aspects of the model, type of techniques used, etc. A thorough understanding may facilitate reproducibility, quality control, as well as adhere to compliance issues.

In system 200, the data scientist, sometimes referred to herein as a user 201, interacts with the computing notebook to create and/or tune models. An interactive computing notebook comprises a sequence of cells, as illustrated by way of example in block 202. Each box in the block 202 represents a cell that is worked on by a user 201. The document creation engine captures the actions taken in the notebook by studying each of the cells (204). For example, actions may include processing of input files, processing of output files, modification of files of a cell, execution of a cell, reference to a library, etc. For example, consider user 201 modifying cell 204 by referring to data3.csv instead of data2.csv. Such adjustment would be recorded by the documentation creation engine as a salient action. Alternatively, user 201 may execute cell 204 or refer to a separate library, which are each also recorded by the document creation engine as salient actions in connection with cell 204.

Next, metadata (e.g., 210) may be added for each corresponding action, as illustrate by way of example by blocks 210. As used herein, metadata relate to building blocks that help the analysis of the user interactions in relation to model creation (e.g., a piece of information to help characterize the user interactions, such as "function renamed," "input file renamed," "function input parameter replaced," "visualization type replaced," etc.) For example, the metadata may explain that the user 201 changed from data2.csv to data3.csv and then back to data2.csv, thereby indicating that data3.csv was tried but not favored by the user. In one embodiment, the document creation engine 103 may add a semantic layer to the actions, thereby giving meaning to each action, including industry domain information 212.

Reference now is made to FIG. 3, which illustrates a conceptual data engineering flow 300, consistent with an illustrative embodiment. In various embodiments, the flow 300 can be performed independent from, or an extension of, the system 200 of FIG. 2. FIG. 3 is described below with reference to the architecture 100 of FIG. 1.

As used herein, data engineering refers to the harvesting and processing of data (e.g., big data) that can be used for machine learning. For example, data engineering may include a data selection component 310 and a data transformation component 312. Data selection 310 may involve harvesting data that is relevant for a particular task. Data transformation 312 relates to operations on top of the original data to be consumed by the next steps of model creation, which may include how the data is split between training and testing, or the unit inside the data that is transformed (e.g. from seconds to hours), or some filter that is be passed over the original data. The data provided by the data engineering 302 can then be used for model training 320.

For example, one stakeholder 306 (e.g., a data scientist) may be more interested in data transformation 312, whereas another stakeholder (e.g., a manager) may be more interested in data selection 310. The documentation creation engine is able to differentiate normal actions (e.g., depicted as clear circles in FIG. 3) from impactful actions (e.g., depicted as solid circles in FIG. 3). To that end, the document creation engine 103 has an impact detector (e.g., module 176 of FIG. 1) that identifies the impact of an action or a set of actions performed by a user (e.g., data scientist)

interacting with the interactive computing notebook 113 with respect to a model being created. For example, in various embodiments, the impact detector 176 may identify parameters where a metric, such as accuracy, grows by a predetermined threshold; identify whether a result is good enough after several attempts; identify transformation of code or modification of data that happened so user moved to next phases of the model development; identify addition/transformation of a visualization component that also helped user move to next phases of the model development, which is common because several insights when creating a model can happen via visual inspection of intermediate data generated during model development; etc.

For example, consider a data scientist adjusting a parameter over a threshold number of iterations (and/or over long period of time, such as several days). The action impact detector 176 may identify such effort to be an impactful action. Alternatively, a large difference (delta between a previous iteration and a present iteration) in response to a user adjusting a parameter (e.g., a variable) may be indicative to the action impact detector 176 that the present action is one of relevant impact (i.e., impactful action). Similarly, if the accuracy is improved by a predetermined threshold by adjustment of a parameter and/or dataset used, such adjustment may be deemed as an action of relevant impact. In the present example, impactful actions are represented by the solid circles in FIG. 3. In one embodiment, the variables and/or threshold parameters can be based on the industry domain variables by referring to a knowledge database that acts as a repository for such information. For example, an alpha variable can be associated with a risk of failure or probability of an accident. The threshold values can be received from a data repository.

With the stored information, the document creation engine 103 can generate a navigable graph, grouping actions into meaningful steps and allowing users (e.g., data scientists) to explore the interconnected model lifecycle as a whole. As mentioned previously, there may be different stakeholders 306 associated for the model being developed. In this regard, there may be different templates 308 for consuming the navigable graphs and the details of the available information. For example, one template may focus more on the technical aspect of data selection 310 and may involve substantial technical detail to be consumed by a data scientist, whereas another template may simply provide an overview of the entire data engineering and model training without substantial technical detail, which may be preferred by a department manager. In one embodiment, a stakeholder can zoom in or out from what is displayed in the navigable interactive graph. For example, data engineering 302 may initially be presented at a high level. A user can choose to zoom further in to identify the separation between data selection 310 and data transformation 312. Still further, the document creation engine 103 is capable of allowing one to further zoom in to specific actions to identify what was performed. For example, upon a zoom in, in action 4, which is deemed an impactful action, the report generator module 178 of the document creation engine 103 can reveal that WeatherV1, WeatherV4, and WeatherV7 datasets were attempted and the corresponding results thereof. In this way, different stakeholders can be accommodated by different presentation of the interactive graph.

Example Process

Figure 4:
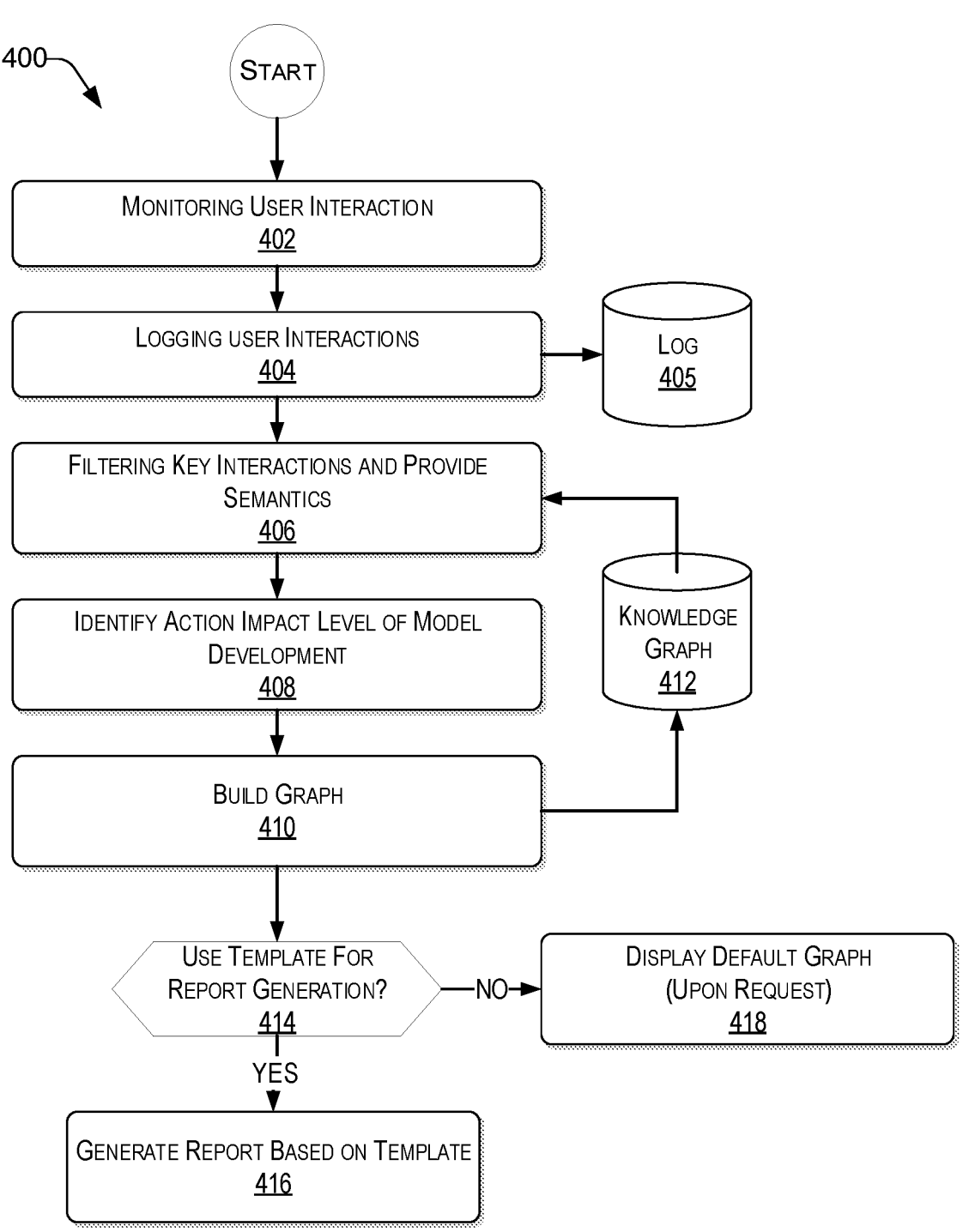
FIG. 4 presents an illustrative process of creating a document of an interactive computing notebook, consistent with an illustrative embodiment.

With the foregoing overview of the example architecture 100 and conceptual overview of a creation of a model document of FIG. 2, it may be helpful now to consider a high-level discussion of an example process. To that end, FIG. 4 presents an illustrative process 400 of creating a document of an interactive computing notebook, consistent with an illustrative embodiment. Process 400 is illustrated as a collection of blocks in a logical flowchart, which represents sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 400 is described with reference to the architecture 100 of FIG. 1.

At block 402, the document creation engine 103 monitors user interaction with the interactive notebook 113.

At block 404, the document creation engine 103 logs the user interactions in a log database 405. The user interactions may include manipulation(s) of one or more cells of the interactive computing notebook 113, such as, cell contents, length of time a user interacts with a cell, changes in the code (e.g., including changes in variable values, functions, modules, etc.), data loads and transformations, definition of models, which cell(s) a user interacts with most, order of execution, etc.

At block 406, the document creation engine 103 filters key entries in the log. In one embodiment, what is considered "key" may be received from a knowledge graph 412. The document creation engine 103 may also receive from the knowledge graph 412 semantics of the filtered entries in the log. For example, addition of code such as "df=pandas.read_csv('data.csv')" is mapped to a "load data" action. Operating in the columns of the loaded data frame (df above) can be mapped to a feature selection, or data transformation operation. For example, identifying the user moving back and forth between different cells and querying and plotting the data might be mapped to an exploration of the data.

At block 408, the document creation engine 103 identifies "impactful actions," which are salient points in the flow of the user interaction with the computing notebook 113 through detected changes in the notebook (e.g., the code of a cell has changed). Whenever an action that is impactful is identified, it is recorded as such. In one embodiment, an impactful action is identified by the action impact detector 176 of the document creation engine 103 when the accuracy (or any other user-defined quality metric) of a machine learning (ML) model grows to predetermined threshold (e.g., an increase of 10%) after the user tries different values for model algorithms, model size (e.g., number of layers in a Neural Network), optimizers, or model parameters. Possible embodiments of the definition of the threshold include: (i) the threshold can be defined in the configuration of the system; (ii) the threshold can be automatically learned using supervised machine learning algorithms and past detected impact actions from other user notebook interactions (in which a values of a given quality metric and the user leaving a stopping changing model configuration can be used as features of the threshold learning).

In one embodiment, an impactful action is identified when the user ceases trying different combinations of parameters and starts using the obtained model. For example, a user may loop over three cells in which the user tries different parameters, where two cells are related to setup of those parameters and execution of the training and a third cell is the verification of the model accuracy. This act then detects that after N interactions with this loop the user then finally moves to other parts of the computing notebook (e.g., to plot graphs or use the trained model). In this embodiment, the user may not have increased a user-defined quality metric, however this user learns that the result is sufficient to move on to other parts of the notebooks. In this embodiment, the action impact can relate to the number of attempts until the user stops trying model parameter combinations.

In one embodiment, an impactful action is identified from the interactive computing notebook 113 when the user changes the dataset by splitting the data into training and validation datasets (e.g., a split factor), thereby obtaining better results.

In one embodiment, an impactful action is identified from the interactive computing notebook 113 when the user changes the data transformation pipeline, analyzes the resulting dataset from the changed pipeline and decides to move from a data preprocessing phase to a model building phase.

In one embodiment, an impactful action is identified from the interactive computing notebook 113 when the user modifies the type of a model output visualization. This is a relevant impact action because many insights are provided via user visual inspection. For example, a user may be testing parameters in a machine learning model and displaying a few intermediate data points. The user may continue doing that for a while as the user is not satisfied with the results. However, when the user decides to plot a graph with a large number of data points, the user may realize that a good model has been developed. Then, the user continues to the next steps of the model development—for instance, to make a comparison with other models. The fact that the user created a visual component to see all the datapoints and that such creation made the user move on, that means that such visual inspection component was impactful for the process of the model creation.

At block 410, the report generator module 178 module of the document creation engine 103 builds a graph representing the interactive computing notebook 113. The graph can be based on the action impacts and the weight of each impact. Additional information may be included, such as traces of all the actions executed by the data scientists, or links to all used datasets that did not end up being used by the final created model. In addition, at this block 410, the documentation server 116 uses the added semantics to the filtered entries in block 406 to build a knowledge graph and adds the relationships between the entries and the identified "impact actions" of block 408. The knowledge graph may comprise nodes and edges. For example, a node may include computing notebook 113 cell executions; the used and generated variables identified in the interactive computing notebook 113; data transformations in the interactive computing notebook 113; the intermediate created models; and the impact actions identified for each cell of the interactive computing notebook 113.

Each node has properties, depending on its type. For instance, cell executions have their execution times, their source code. Models include quality measurements, such as accuracy or other user-defined function. Impact actions have their impact value.

Edges between node represent relationships between the entities above. For instance, a cell produced a model after consuming a dataset. The verbs in the sentence above determine the relationships between the nodes. Each "Impact Action" node is associated with at least two cell nodes: one including the cell state before the action and another with the state after the action. The weights identified from the action impact by the document creation engine 103 can be used in the nodes and edges to group clusters of actions and provide zoom in/out levels.

In one embodiment, the action impact detector 176 of the document creation engine can use the following metrics to find actions having largest impact, and store the impact value in the property of the "Impact Action" node. In one embodiment, a node entropy metric could be used to remove nodes that are not important to the process. In another embodiment, a PageRank metric could be used to identify cells in the interactive computing notebook 113 that are executed after others. Alternatively, or in addition, the document creation engine 103 can use other node metrics as node centrality (e.g., eigenvalue, degree, betweenness, etc.) to characterized the node importance coupled with the time spent in the cell and cell semantic. In various embodiments, different color codes, patterns, shades, etc., can be used to emphasize the degree of impact of each action. The generated graph can be stored in the knowledge graph database 412.

Templates with specifications of levels of information from the graph can be used to generate the report. For instance a data scientistic may want to know all attempts in the model creation during all phases, whereas an executive may only like to know the development model actions that had more impact, the meaning considering the semantic for their industry domain, and only for the data selection and model training phases (for instance data transformation could be ignored from the graph). To that end, at block 414, the report generator module 178 of the document creation engine 103 determines whether a template for the report generation exists. If so (i.e., "YES" at decision block 414), the report generator 178 generates a report based on the existing template. If not (i.e., "NO" at decision block 414), the report generator 178 generates a report that includes a default graph upon request from the user. In one embodiment, the document creation engine 103 responds to a selection (e.g., click of a mouse) on a node and expands the subject node by providing a higher resolution of the action(s) therein.

Example Use Case

The teachings herein may be better understood by way of contrasting examples. Consider, for example, a chief operating officer (COO) asking a chief risk manager (CRM) to review all models used to calculate the probability of complications in a next rocket launch. One of the models is a machine learning one, and the CRM suspects that it could have a performance issue. After the production department assesses the accuracy in production, they conclude that the model is not performing satisfactorily. They take immediate action to abandon the model, and the CRM asked the data science team to figure out why the model failed and create a new one.

Without the teachings herein: The data scientist recovers the interactive computing notebook 500 that generated the model, as illustrated by way of example in FIG. 5. Going through the code and documentation, the data scientist attempts to manually collect the information about the data sets, which is not sufficiently comprehensive due to the volume of data at hand. The data scientist scrutinizes the transformations, and, finally, lists the features used. Next, the data scientist attempts to map back the data sets and features to confirm whether all used features were still valid. The data scientist suspects that one feature came from a corrupted data set that provides inaccurate information, and it is probably the source of the problem. Since the data scientist needs to investigate many sources of information and manually create the link between the model, feature, and data set, this investigation takes several weeks and has a risk of being error prone. Because the problem is in one data set and the interactive computing notebooks only kept the register of the last experiment that generated the model, the data scientist starts building the new model almost from scratch, having to recreate all documentation for the CRM present to the COO. This process takes four weeks.

With the teachings herein: Since the model creators had their interactive computing notebooks instrumented with the document creation engine 103 of FIG. 1, the document creation engine 103 stored all functions' executions characterizing it and its parameters. When the data scientists start their investigation, the document creation engine 103 provides a navigable graph that facilitates a quick identification of the features and datasets, as well as characteristics of the corrupted dataset, including data size, graphs plotting statistics about the data size (such as data distribution, and number of datapoints). With the understanding that the problem is related to the corrupted dataset based on a high-level navigable graph generated by the document creation engine 103, the data scientist can seek for any execution of the interactive computing notebook that has generated the model without the problematic feature and with reasonable accuracy. Since the semantic aware graph generator 174 of the document creation engine 103 created the navigable graph, it readily reveals that a model that performed 1% less than the previous version and used only validated features was the source of the problem. The data scientist recreates the model using the parameters and tests it in the new production data receiving satisfactory results. By virtue of the document creation engine 103 having captured all information about the model and created the interactive navigable graph, the resolution of the problem is easy, and the whole process takes days instead of weeks.

Example Computer Platform

As discussed above, functions relating to documenting actions in source code development environment such as an interactive computing notebook can be performed with the use of one or more computing devices connected for data communication via wireless or wired communication, as shown in FIG. 1 and in accordance with the architecture 200 and 300 of FIGS. 2 and 3, respectively. FIG. 6 provides a functional block diagram illustration of a computer hardware platform 600 that can be used to implement a particularly configured computing device that can host a document creation engine 640. In particular, FIG. 6 illustrates a network or host computer platform 600, as may be used to implement an appropriately configured server, such as the document creation server 116 of FIG. 1.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602.

In one embodiment, the HDD 606, has capabilities that include storing a program that can execute various processes, such as the Document creation engine 640, in a manner described herein. The Document creation engine 640 may have various modules configured to perform different functions, such those discussed in the context of FIG. 1 and others. For example, the document creation engine 640 may include an interaction and execution detail retrieval handler module 672 that is operative to capture data related to user interaction and execution of cells of an source code development environment, as well as host ontologies to understand the semantics of the content that was retrieved. There may be an impact and/or semantic aware graph generator 674 that is operative to generate a graph based on the action impacts and semantics of the content of the source code development environment (e.g., interactive computing notebook) cells. There may be an action impact detector 676 that is operative to detect the impact of an action or a set of actions performed by a user (e.g., data scientist), as discussed herein. There may be a report generator 678 that is operative to generate a navigable graph that is accessible to the user at different levels of granularity.

While modules 672 to 678 are illustrated in FIG. 6 to be part of the HDD 606, in some embodiments, one or more of these modules may be implemented in the hardware of the computing device 600. For example, the modules discussed herein may be implemented in the form of partial hardware and partial software. That is, one or more of the components of the document creation engine 640 shown in FIG. 6 may be implemented in the form of electronic circuits with transistor(s), diode(s), capacitor(s), resistor(s), inductor(s), varactor(s) and/or memristor(s). In other words, the document creation engine 640 may be implemented with one or more specially-designed electronic circuits performing specific tasks and functions described herein.

Example Cloud Platform

As discussed above, functions relating to managing the compliance of one or more client domains, may include a cloud 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, an illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
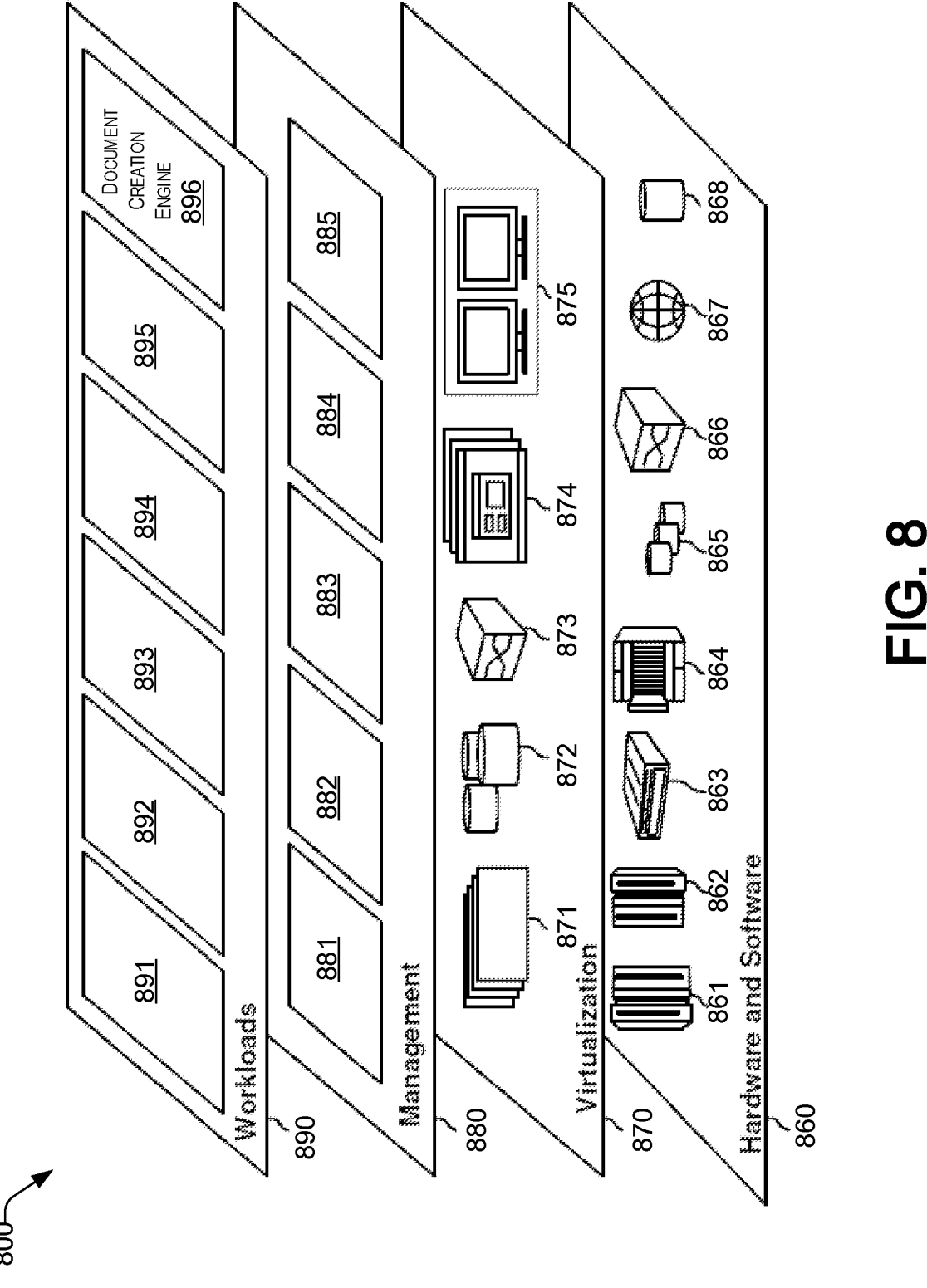
FIG. 8 depicts abstraction model layers, consistent with an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and document creation engine 896, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device, comprising:
a processor;
a network interface coupled to the processor to enable communication over a network; and
an engine coupled to the processor and configured to perform operations, comprising:
 monitoring user actions regarding a model development, wherein
 the user actions are captured as a massive data set in a first source code development environment that is an interactive computing notebook, the interactive computing notebook comprises a sequence of cells,
 the sequence of cells comprises code fragments,
 the interactive computing notebook is configured to provide a notebook document based on Java Script Object Notation (JSON),
 the monitoring of the user actions comprises determining a length of time of a user interaction with a corresponding code fragment of the code fragments in the first source code development environment,
 the user interaction includes modifying the corresponding code fragment, and
 the length of time of the user interaction with the corresponding code fragment indicates an importance of a respective user action of the user actions performed in the corresponding code fragment;
 providing semantic meaning for each user action of the user actions captured in the interactive computing notebook;
 determining a degree of impact of each user action of the user actions in connection with the model development based on the importance of the respective user action of the user actions;
 identifying a set of user actions among the user actions as impactful actions, wherein each user action of the identified set of user actions has the degree of impact above a predetermined threshold, as impactful actions;
 developing an interactive knowledge graph based on the user actions, the semantic meaning of each user action of the user actions, and the degree of impact of each user action of the user actions, wherein
 the interactive knowledge graph comprises nodes and edges, and
 the nodes comprise a code fragment execution, one or more variables identified in the first source code development environment, one or more data transformations in the first source code development environment, one or more intermediate machine learning (ML) models during the model development, and the degree of impact of each user action of the user actions determined for each code fragment of the code fragments; and
 controlling display of the interactive knowledge graph in a navigable way, wherein
 the interactive knowledge graph highlights the impactful actions, and
 the interactive knowledge graph is configured to be zoomed in and zoomed out to different levels of granularity to accommodate different types of users.

2. The computing device of claim 1, wherein the monitoring of the user actions comprises at least one of:

determining contents of each code fragment of the code fragments of the interactive computing notebook; and identifying changes in a code of an intermediate ML model of the one or more intermediate ML models, wherein the changes comprises changes in variable values, functions, or modules.

3. The computing device of claim 1, wherein the determining of the degree of impact of each user action of the user actions in connection with the model development, is based on a change in a source code, and wherein the change comprises a change in a variable value, a change in a function, and a change in a module of the source code.

4. The computing device of claim 1, wherein the determining of the degree of impact of each user action of the user actions in connection with the model development is based on a number of times a different value is used for a model parameter of an intermediate ML model of the one or more intermediate ML models.

5. The computing device of claim 1, wherein the determining of the degree of impact of each user action of the user actions in connection with the model development is based on determining that a user transforms a dataset of the first source code development environment.

6. The computing device of claim 1, wherein the determining of the degree of impact of each user action of the user actions in connection with the model development is based on determining that a user transitioned from a data preprocessing phase to a building phase of the model development.

7. The computing device of claim 1, wherein the predetermined threshold for each corresponding user action of the user actions is automatically learned by the engine using machine learning algorithms and past detected impactful actions from other user interactions from a second source code development environment, wherein the second source code development environment is different from the first source code development environment.

8. The computing device of claim 1, wherein the predetermined threshold for each corresponding user action of the user actions is received from a knowledge database.

9. The computing device of claim 1, wherein one or more nodes, of the nodes of the interactive knowledge graph, are configured to expand to provide more detailed information about the model development.

10. The computing device of claim 1, wherein the controlling of the display of the interactive knowledge graph in the navigable way comprises:

determining a recipient of the interactive knowledge graph;

determining a template for the recipient of the interactive knowledge graph; and controlling the display of interactive knowledge graph based on the template, wherein the interactive knowledge graph is displayed in a level of detail that is associated with the recipient.

11. A non-transitory computer readable storage medium tangibly embodying a computer readable program code having computer readable instructions that, when executed, causes a computer device to carry out a method, comprising:

monitoring user actions regarding a model development, wherein the user actions are captured as a massive data set in a first source code development environment that is an interactive computing notebook;

the interactive computing notebook comprises a sequence of cells;

the sequence of cells comprises code fragments;

the interactive computing notebook is configured to provide a notebook document based on Java Script Object Notation (JSON);

the monitoring of the user actions comprises determining a length of time of a user interaction with a corresponding code fragment of the code fragments in the first source code development environment;

the user interaction includes modifying the corresponding code fragment; and the length of time of the user interaction with the corresponding code fragment indicates an importance of a respective user action of the user actions performed in the corresponding code fragment;

providing semantic meaning for each user action of the user actions captured in the interactive computing notebook;

determining a degree of impact of each user action of the user actions in connection with the model development based on the importance of the respective user action of the user actions;

identifying a set of user actions among the user actions as impactful actions, wherein each user action of the identified set of user actions has the degree of impact above a predetermined threshold;

developing an interactive knowledge graph based on the user actions, the semantic meaning of each user action of the user actions, and the degree of impact of each user action of the user actions, wherein the interactive knowledge graph comprises nodes and edges; and the nodes comprise a code fragment execution, one or more variables identified in the first source code development environment, one or more data transformations in the first source code development environment, one or more intermediate machine learning (ML) models during the model development, and the degree of impact of each user action of the user actions determined for each code fragment of the code fragments; and controlling display of the interactive knowledge graph in a navigable way, wherein the interactive knowledge graph highlights the impactful actions, and the interactive knowledge graph is configured to be zoomed in and zoomed out to different levels of granularity to accommodate different types of users.

12. The non-transitory computer readable storage medium of claim 11, wherein the monitoring of the user actions comprises at least one of:

determining contents of each code fragment of the code fragments of the interactive computing notebook; and identifying changes in a code of an intermediate ML model of the one or more intermediate ML models, wherein the changes comprises changes in variable values, functions, or modules.

13. The non-transitory computer readable storage medium of claim 11, wherein the determining of the degree of impact of each user action of the user actions in connection with the model development is based on at least one of:

a number of times a different value is used for a model parameter of an intermediate ML model of the one or more intermediate ML models;

determining that the user transforms a dataset of the first source code development environment; and determining that a user transitioned from a data preprocessing phase to a building phase of the model development.

14. The non-transitory computer readable storage medium of claim 11, wherein the controlling of the display of the interactive knowledge graph in the navigable way comprises:

determining a recipient of the interactive knowledge graph;

determining a template for the recipient of the interactive knowledge graph; and controlling the display of interactive knowledge graph based on the template, wherein the interactive knowledge graph is displayed in a level of detail that is associated with the recipient.

15. A computer implemented method, comprising:

monitoring user actions regarding a model development, wherein the user actions are captured as a massive data set in a first source code development environment;

the first source code development environment is an interactive computing notebook;

the interactive computing notebook comprises a sequence of cells the sequence of cells comprises code fragments;

the interactive computing notebook is configured to provide a notebook document based on Java Script Object Notation (JSON);

the monitoring of the user actions comprises determining a length of time of a user interaction with a corresponding code fragment of the code fragments in the first source code development environment;

the user interaction includes modifying the corresponding code fragment; and the length of time of the user interaction with the corresponding code fragment indicates an importance of a respective user action of the user actions performed in the corresponding code fragment;

providing semantic meaning for each user action of the user actions captured in the interactive computing notebook;

determining a degree of impact of each user action of the user actions in connection with the model development based on the importance of the respective user action of the user actions;

identifying a set of user actions among the user actions as impactful actions, wherein each user action of the identified set of user actions has the degree of impact above a predetermined threshold;

developing an interactive knowledge graph based on the user actions, the semantic meaning of each user action of the user actions, and the degree of impact of each user action of the user actions, wherein the interactive knowledge graph comprises nodes and edges; and the nodes comprise a code fragment execution, one or more variables identified in the first source code development environment, one or more data transformations in the first source code development environment, one or more intermediate machine learning (ML) models during the model development, and the degree of impact of each user action of the user actions determined for each code fragment of the code fragments; and controlling display of the interactive knowledge graph in a navigable way, wherein the interactive knowledge graph highlights the impactful actions, and the interactive knowledge graph is configured to be zoomed in and zoomed out to different levels of granularity, to accommodate different types of users.

* * * * *